(12) United States Patent
Aurongzeb et al.

(10) Patent No.: US 10,640,419 B2
(45) Date of Patent: May 5, 2020

(54) COMPOSITE PLASTIC DISPLAY COVER

(71) Applicant: Dell Products L.P., Round Rock, TX (US)

(72) Inventors: Deeder M. Aurongzeb, Round Rock, TX (US); Stefan Peana, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/542,866

(22) Filed: Aug. 16, 2019

(65) Prior Publication Data

US 2019/0367409 A1 Dec. 5, 2019

Related U.S. Application Data

(62) Division of application No. 14/444,485, filed on Jul. 28, 2014, now Pat. No. 10,472,277.

(51) Int. Cl.
| | |
|---|---|
| *C03C 17/42* | (2006.01) |
| *B32B 3/08* | (2006.01) |
| *B32B 17/06* | (2006.01) |
| *C03C 17/00* | (2006.01) |
| *B32B 27/30* | (2006.01) |
| *B32B 27/28* | (2006.01) |
| *B32B 27/08* | (2006.01) |
| *B32B 27/20* | (2006.01) |
| *B32B 27/40* | (2006.01) |
| *B32B 27/36* | (2006.01) |
| *B32B 27/12* | (2006.01) |
| *C23C 18/12* | (2006.01) |

(52) U.S. Cl.
CPC .............. *C03C 17/42* (2013.01); *B32B 3/08* (2013.01); *B32B 17/067* (2013.01); *B32B 27/08* (2013.01); *B32B 27/12* (2013.01); *B32B 27/20* (2013.01); *B32B 27/281* (2013.01); *B32B 27/304* (2013.01); *B32B 27/308* (2013.01); *B32B 27/365* (2013.01); *B32B 27/40* (2013.01); *C03C 17/008* (2013.01); *C23C 18/127* (2013.01); *C23C 18/1212* (2013.01); *C23C 18/1216* (2013.01); *C23C 18/1254* (2013.01); *B32B 2255/10* (2013.01); *B32B 2255/20* (2013.01); *B32B 2262/105* (2013.01); *B32B 2262/106* (2013.01); *B32B 2264/102* (2013.01); *B32B 2264/107* (2013.01); *B32B 2307/302* (2013.01); *B32B 2307/402* (2013.01); *B32B 2307/41* (2013.01); *B32B 2307/536* (2013.01); *B32B 2307/584* (2013.01)

(58) Field of Classification Search
CPC ................................................ B32B 2264/107
See application file for complete search history.

(56) References Cited

U.S. PATENT DOCUMENTS

| | | |
|---|---|---|
| 5,674,790 A | 10/1997 | Araujo |
| 7,558,054 B1 | 7/2009 | Prest |
| 2003/0077453 A1 | 4/2003 | Oaku |
| 2007/0003746 A1 | 1/2007 | Chen |

(Continued)

*Primary Examiner* — Ian A Rummel

(74) *Attorney, Agent, or Firm* — Baker Botts L.L.P.

(57) ABSTRACT

Methods for manufacturing a composite plastic display cover include defining an edge portion of a base plastic cover sheet. A strengthening treatment is applied to the edge portion of the base plastic cover sheet to improve mechanical strength. A hardening treatment is applied to the base plastic cover sheet and over the strengthening treatment to improve anti-glare and anti-scratch properties.

13 Claims, 3 Drawing Sheets

(56) References Cited

U.S. PATENT DOCUMENTS

| | | |
|---|---|---|
| 2009/0142568 A1 | 6/2009 | Dejneka et al. |
| 2009/0215607 A1 | 8/2009 | Dejneka et al. |
| 2009/0220761 A1 | 9/2009 | Dejneka et al. |
| 2009/0280709 A1 | 11/2009 | Rukavina |
| 2010/0035038 A1 | 2/2010 | Barefoot et al. |
| 2010/0302473 A1 | 12/2010 | Poveda et al. |
| 2011/0003142 A1 | 1/2011 | Asuka et al. |
| 2011/0245640 A1 | 10/2011 | Maclaughlin |
| 2012/0058320 A1 | 3/2012 | Kishimoto et al. |
| 2013/0083506 A1 | 4/2013 | Wright |
| 2013/0147330 A1 | 6/2013 | Difonzo et al. |
| 2013/0323444 A1 | 12/2013 | Ehemann |
| 2015/0202845 A1 | 7/2015 | Cherekdjian |

300 — METHOD OF MANUFACTURING A COMPOSITE PLASTIC DISPLAY COVER

APPLY A STRENGTHENING TREATEMENT TO AN EDGE PORTION OF A BASE PLASTIC COVER SHEET CORRESPONDING IN SIZE TO THE COMPOSITE PLASTIC DISPLAY COVER AND HAVING A CENTER PORTION, INCLUDING APPLYING A POLYMERIC COMPOSITE COATING TO THE EDGE PORTION — 302

APPLY A HARDENING TREATMENT TO THE BASE PLASTIC COVER SHEET INCLUDING APPLYING A NANOCERAMIC SOLGEL — 304

DRYING THE NANOCERAMIC SOLGEL — 306

THERMALLY TREATING THE DRIED NANOCERAMIC SOLGEL TO FORM A SCRATCH-RESISTANT LAYER AT AN EXTERNAL SURFACE OF THE COMPOSITE PLASTIC DISPLAY COVER — 308

FIG. 3

COMPOSITE PLASTIC DISPLAY COVER

CROSS-REFERENCE TO RELATED APPLICATION

The present application is a divisional application of pending U.S. patent application Ser. No. 14/444,485 filed Jul. 28, 2014, the contents of which is hereby incorporated by reference in its entirety for all purposes.

BACKGROUND

Field of the Disclosure

This disclosure relates generally to information handling systems and, more particularly, to a composite plastic display cover for information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Advancements in packaging design have reduced both the weight and thickness of information handling systems. In particular, components included in displays of portable information handling systems, such as laptops, notebooks, and tablet form factors, are the object of efforts to reduce weight and thickness, without compromising structural strength. Specifically, display covers are rapidly becoming a primary interface between a user and a portable information handling system. Often referred to as a 'cover glass' because of the glass base material used, display covers are also subject to optical performance attributes, such as supporting high resolution displays, high brightness, excellent color reproduction, as well as supporting touch functionality.

As overall weight of portable information handling systems decreases, the weight contribution of display covers made of glass has come under increased scrutiny by product designers. Although reducing the thickness of a display cover made of glass will reduce weight, an undesirable reduction in structural rigidity may also occur with thinner display covers. Additionally, newer designs of information handling systems involving integration of various user interface elements are appearing and are affecting display cover performance. Display covers may now include features such as color bezels, protrusions, holes, or other mounting structures for buttons or other electronic devices, such as cameras and microphones. Such features may introduce localized stress concentrations that may lead to undesirable early failure of display covers, often in the form of cracks or fractures.

Accordingly, it is desirable to have an improved design and a correspondingly improved manufacturing method for display covers in an information handling system that yields lightweight yet sufficiently robust display covers.

SUMMARY

In one aspect, a disclosed method is for manufacturing a composite plastic display cover for use in an information handling system. The method may include applying a strengthening treatment to an edge portion of a base plastic cover sheet, the base plastic cover sheet corresponding in size to the composite plastic display cover and having a center portion, including applying a polymeric composite coating to the edge portion. After applying the strengthening treatment, the method may include applying a hardening treatment to the base plastic cover including applying a nanoceramic solgel. The method may include drying the nanoceramic solgel, and thermally treating the dried nanoceramic solgel to form a silica layer at an external surface of the composite plastic display cover.

Other disclosed aspects include a composite plastic display cover for use in an information handling system, a display having the composite plastic display cover, and an information handling system including a display having the composite plastic display cover.

BRIEF DESCRIPTION OF THE DRAWINGS

For a more complete understanding of the present invention and its features and advantages, reference is now made to the following description, taken in conjunction with the accompanying drawings, in which:

FIG. 3 is flowchart depicting selected elements of an embodiment of a method for manufacturing a composite plastic display cover for use in an information handling system.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

As noted previously, current information handling systems may demand ever thinner and lighter products, without sacrificing strength and stability. In particular, thinner displays are being developed for portable information handling systems that include a display cover. As will be described in further detail, the inventors of the present disclosure have developed novel methods and structures disclosed herein for manufacturing a composite plastic display cover having a strengthened edge portion and a hardened external surface. The disclosed composite plastic display cover is thin and lightweight, while meeting expectations for durability and high quality.

Figure 1:
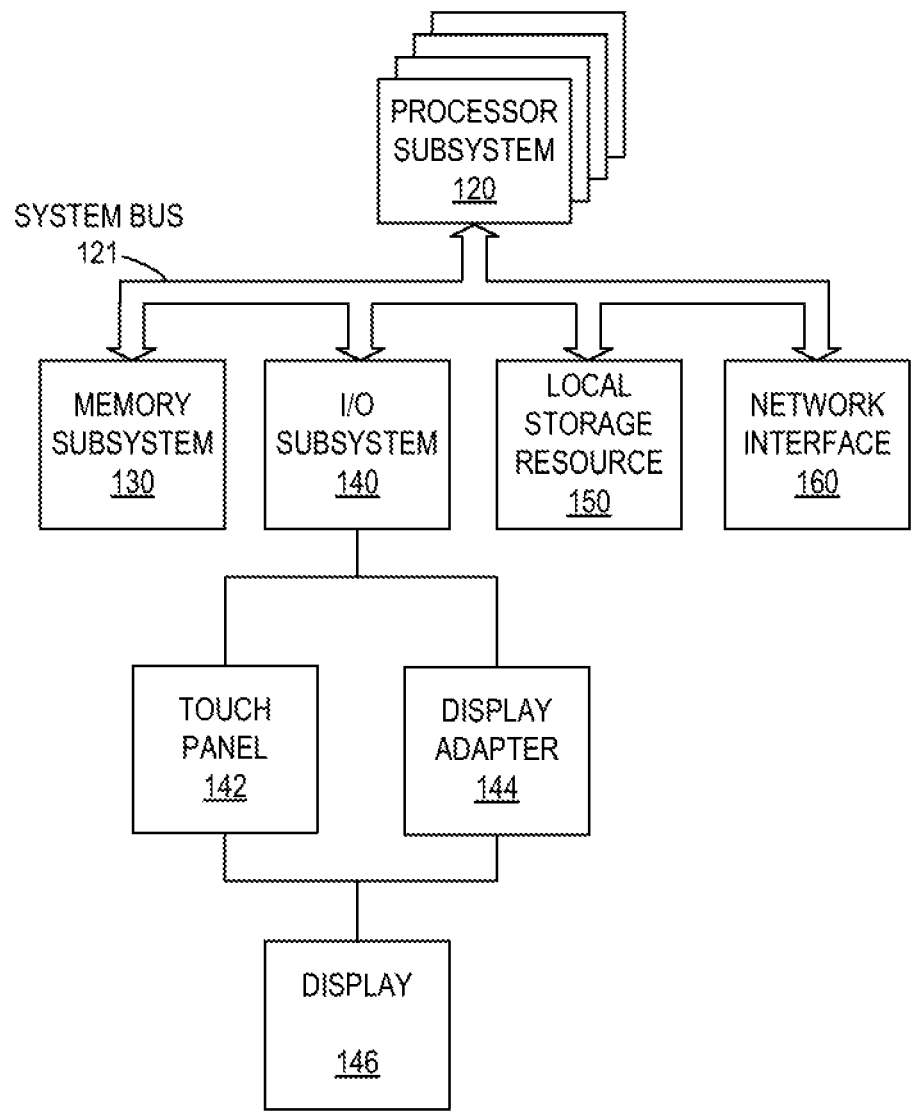
FIG. 1 is a block diagram of selected elements of an embodiment of an information handling system.
Figure 2:
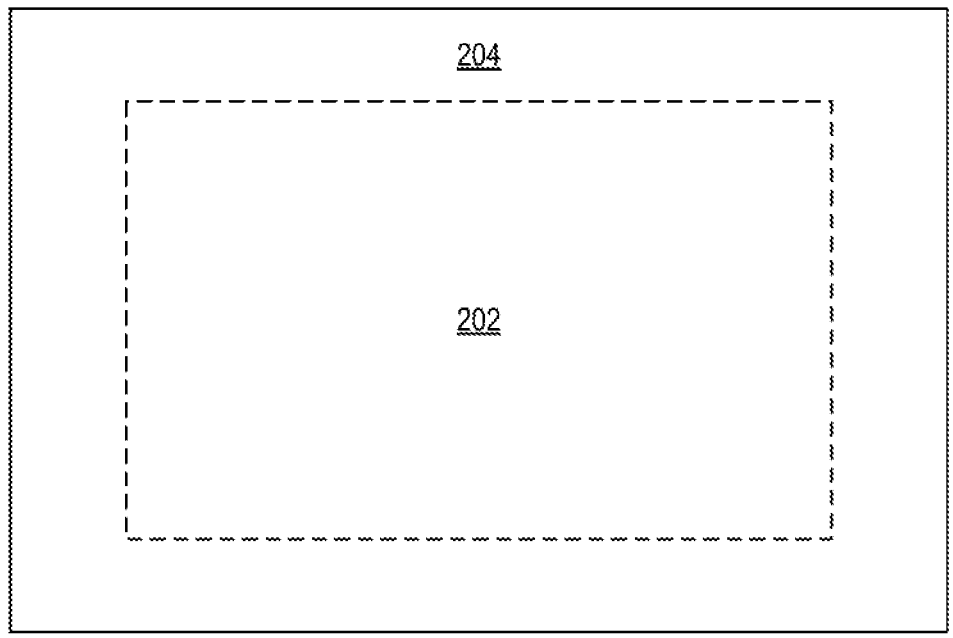
FIG. 2 is a block diagram of selected elements of an embodiment of a plastic display cover.

Particular embodiments are best understood by reference to FIGS. 1, 2, and 3 wherein like numbers are used to indicate like and corresponding parts.

Turning now to the drawings, FIG. 1 illustrates a block diagram depicting selected elements of an embodiment of information handling system 100. As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of physical hardware 102). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, network storage resource 170 may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data. In system 100, I/O subsystem 140 may comprise a system, device, or apparatus generally operable to receive and/or transmit data to/from/within system 100. I/O subsystem 140 may represent, for example, a variety of communication interfaces, graphics interfaces, video interfaces, user input interfaces, and/or peripheral interfaces. As shown, I/O subsystem 140 may comprise touch panel 142 and display adapter 144. Touch panel 142 may include circuitry for enabling touch functionality in conjunction with display 146 that is driven by display adapter 144. As shown, display 146 may include a composite plastic display cover, as described herein.

Turning now to FIG. 2, selected elements of an embodiment of composite plastic display cover 200 are illustrated. As shown, composite plastic display cover 200 may represent various embodiments of composite plastic display covers described herein. Composite plastic display cover 200 includes edge portion 204, which may be a band at an exterior edge. Edge portion 204 may extend around edges of composite plastic display cover 200 and may cover both faces. Composite plastic display cover 200 includes center portion 202, which may represent a display portion through which a user views a display that composite plastic cover 200 is attached to. Center portion 202 may represent both faces of composite plastic display cover 200.

As a result of the various desirable characteristics of a display cover, as described above, composite plastic display cover 200 may be formed using a base plastic cover sheet that is strengthened in a specific manner. In particular, edge portion 204 may be subject to a strengthening treatment involving application of a strengthening layer. Because edge portion 204 is not normally visible to a user and does not represent the display portion, strengthening treatments used at edge portion 204 may not have the same optical properties as other treatments used. After the strengthening treatment is performed, a hardening treatment involving application of a hardening layer over an entire exterior surface of composite plastic display cover 200 may be performed. The hardening treatment may apply materials with desired optical properties for high quality display performance. The hardening treatment may compensate for an otherwise lower than desirable hardness of the base plastic cover sheet, and may increase surface hardness of composite plastic display cover accordingly. After the hardening treatment, a hardness of center portion 202 may be higher, or substantially higher, than edge portion 204. The hardness is measured at a surface of composite plastic display cover 200. Specifically, after the hardening treatment is applied, the hardness of edge portion 204 may be about 3-4 H, where H is a hardness value according to the Mohs scale of mineral hardness, while the hardness of center portion 202 may be about 6-8 H. The reduced hardness of edge portion 204 may arise from the strengthening layer, which may add strength but may reduce hardness or stiffness. The higher hardness of center portion 202 may result in excellent anti-scratch properties of the hardening layer, which is desirable.

Manufacture of composite plastic display cover 200 may involve different steps, in particular embodiments. First the base plastic cover sheet may be cut to a final size corresponding to composite plastic display cover 200. The base plastic cover sheet may be made of a suitable polymer material, such as polyethylene terephthalate (PET). In some embodiments, the base plastic cover sheet is itself a plastic-glass composite, for example, including alternating plastic and glass layers.

Then, the strengthening treatment may be applied to edge portion 204. For purposes of the strengthening treatment, center portion 202 may be masked to expose only edge portion 204. A polymeric composite coating may be applied to edge portion 204. The polymeric composite coating may be diffused or laminated onto edge portion 204 of the base plastic cover sheet. The polymeric composite coating may include with different polymer formulations for specific desired properties. The polymeric composite coating may include at least one of: polyurethane (PU), polyetherimide (PEI), impact-modified poly(methyl methacrylate) (PMMA), polycarbonate (PC), polyvinylpyrrolidine (PVP), and glycol-modified polyethylene terephthalate (PET-G). For example, to obtain desired anti-fog properties, polyvinylpyrrolidine may be used. In other example, to obtain improvement of adhesion to zirconia, glycol-modified polyethylene terephthalate may be used. The polyurethane polymer may be diffused with particulate or filler, such as silica fiber, silica particles, ceramic fiber, or ceramic particles. In certain embodiments, edge portion 204 may be further laminated with a carbon fiber layer to improve strength. In some embodiments, edge portion 204 includes PEI with surface-modified sepiolite nanofibers. In particular embodiments edge portion 204 includes PC that is reinforced with vapor-grown carbon nanofibers that are laser infused at about 20% composition by volume, which may impart a degree of surface conductivity to edge portion 204.

In some embodiments, edge portion 204 is diffused with a colorant to form a bezel for decorative or ornamental purposes. The colorant may be provide at least a certain amount of opacity to edge portion 204. The colorant may be laser infused where laser energy is used to promote diffusion of the colorant into edge portion 204 at a low temperature near a softening temperature of the base plastic cover sheet. Laser infusion may result in a highly uniform surface with specifically desired gloss values. The strengthening treatment may include applying an anti-microbial layer to edge portion 204, which may come into direct contact with a user or the environment.

After the strengthening treatment, the hardening treatment may be applied. In certain embodiments, the hardening layer includes a nanoceramic and is applied to the exterior surface of the base plastic cover sheet, including over the strengthening layer. Thus, the hardening layer may encapsulate the strengthening layer, at least to a certain extent. In some embodiments, the hardening layer may comprise two different layers. A first ultrathin hardening layer (about 10-20 nm) may be vapor deposited over edge portion 204 and center portion 202. The first ultrathin layer may be vapor deposited silica or a vapor codeposited metal-silica mixture. Then, a second hardening layer may be applied to center portion B202. The second hardening layer may be applied as a nanoceramic solgel. The hardening layer may be about 100-500 nm in overall thickness. The thickness of the hardening layer may depend upon an overall size of composite plastic display cover 200. For example, when a diagonal of composite plastic display cover 200 is about 13 inches or less, a very thin hardening layer of about 100 nm overall thickness may be applied. When the diagonal of composite plastic display cover 200 is greater than about 13", thicker hardness layer coatings may be applied.

The nanoceramic solgel may include alumina, silica, or zirconia that is applied in solution form using an aqueous or alcoholic solvent, which is dried away to leave the nanoceramic hardening layer. The nanoceramic may then be subject to a thermal treatment to form a solid film. Alternatively or additionally, the hardening layer may be vapor deposited onto the base plastic cover. The resulting hardening layer or layers may provide anti-glare and anti-scratch properties that are desirable for composite plastic display cover 200. In certain embodiments the solgel is selected from: LUDOX (E.I. duPont de Nemours and Co., Inc., Wilmington Del.) and NYACOL (Nyacol Co., Ashland Mass.).

In one embodiment, zirconia solgel functionalized with trimethylethoxysilane (TMES) is used for the nanoceramic solgel. Zirconia may act as both a coupling agent and as a C=C provider, while TMES may prevent particle aggregation and may increase hydrophobicity of the hardening layer. The TMES-functionalized zirconia particles may be UV-cured together with a monomer (2-hydroxyethyl methacrylate (2-HEMA)) and a crosslinking agent (dipentaerythritol hexaacrylate (DPHA)) to form highly transparent hard coatings on plastic PET with surface hardness of 6 H. The hardness of the nanoceramic applied as a solgel to form the hardening layer may be controlled by varying particle loading and UV intensity used for curing. In particular embodiments, the base plastic cover sheet is about 0.5 mm thick and the hardening layer is about 100-500 nm thick.

In particular embodiments, increased thermal conductivity of edge portion 204 is desirable, for example, when display electronics in close proximity to composite plastic display cover 200 generate substantial amounts of heat to be dissipated. In such instances, the hardening layer may be formed with a thermally conductive material at edge portion 204 where the hardening layer covers the strengthening layer. In one embodiment, $Si_3N_4$—$Si_2N_2O$—$Y_2Si_2O_7$ may be used where silica is the nanoceramic. In various embodiments, conductive ceramics having thermal conductivity greater than about 100 MW/mK and elastic moduli greater than about 300 GPa, such as AlN and SiC may be used where high hardness is desired with increased thermal conductivity.

Referring now to FIG. 3, a block diagram of selected elements of an embodiment of method 300 for manufacturing a composite plastic display cover for use in an information handling system (such as information handling systems 100) is depicted in flowchart form. It is noted that certain operations described in method 300 may be optional or may be rearranged in different embodiments.

Method 300 may begin by applying a strengthening treatment (operation 302) an edge portion of a base plastic cover sheet corresponding in size to a composite plastic display cover and having a center portion, including applying a polymeric composite coating to the edge portion. A hardening treatment may be applied (operation 304) to the base plastic cover including applying a nanoceramic solgel. The nanoceramic solgel may be dried (operation 306). The dried nanoceramic solgel may be thermally treated (operation 308) to form a scratch-resistant layer at an external surface of the composite plastic display cover.

As disclosed herein, methods for manufacturing a composite plastic display cover include defining an edge portion of a base plastic cover sheet. A strengthening treatment is applied to the edge portion of the base plastic cover sheet to improve mechanical strength. A hardening treatment is applied to the base plastic cover sheet and over the strengthening treatment to improve anti-glare and anti-scratch properties.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of manufacturing a composite plastic display cover for use in an information handling system, the method comprising:
    applying a strengthening treatment to an edge portion of a base plastic cover sheet including applying a polymeric composite coating to the edge portion, the base plastic cover sheet corresponding in size to the composite plastic display cover and having a center portion such that a display covered by the composite plastic display cover is visible through the center portion of the base plastic cover sheet;
    after applying the strengthening treatment, applying a hardening treatment to the base plastic cover sheet including applying a nanoceramic solgel;
    drying the nanoceramic solgel; and
    thermally treating the dried nanoceramic solgel to form a scratch-resistant layer at an external surface of the composite plastic display cover.

2. The method of claim 1, wherein the strengthening treatment includes:
    adding a particulate to the polymeric composite coating selected from at least one of: silica fiber, silica particles, ceramic fiber, and ceramic particles.

3. The method of claim 1, wherein the strengthening treatment includes:
    laminating a carbon fiber layer to the edge portion.

4. The method of claim 1, wherein the strengthening treatment includes:
    diffusing a colorant into the edge portion.

5. The method of claim 4, wherein the colorant is at least partially opaque, and wherein diffusing the colorant includes laser-infusing the colorant.

6. The method of claim 1, wherein the polymeric composite coating includes at least one of:
    polyurethane, polyetherimide, impact-modified poly(methyl methacrylate), polycarbonate, polyvinylpyrrolidine, and glycol-modified polyethylene terephthalate.

7. The method of claim 1, wherein applying the strengthening treatment includes:
    applying an anti-microbial coating to the edge portion.

8. The method of claim 1, wherein the nanoceramic solgel includes at least one of: silica, alumina, and zirconia.

9. The method of claim 1, wherein the strengthening treatment includes:
    vapor-depositing silica to the base plastic cover.

10. The method of claim 1, wherein the base plastic cover sheet comprises a composite of plastic and glass layers corresponding in size to the composite plastic display cover.

11. The method of claim 1, wherein applying the hardening treatment results in a lower hardness at the edge portion and a higher hardness at the center portion.

12. The method of claim 1, wherein applying the hardening treatment includes:
    prior to applying the nanoceramic solgel, vapor depositing a nanolayer of silica to both the edge portion and the center portion; and
    applying the nanoceramic solgel to the center portion over the nanolayer of silica.

13. The method of claim 12, wherein vapor depositing the nanolayer of silica includes:
    vapor codepositing a metal with the silica to form a nanolayer of a silica-metal mixture.

* * * * *